Figure 1:
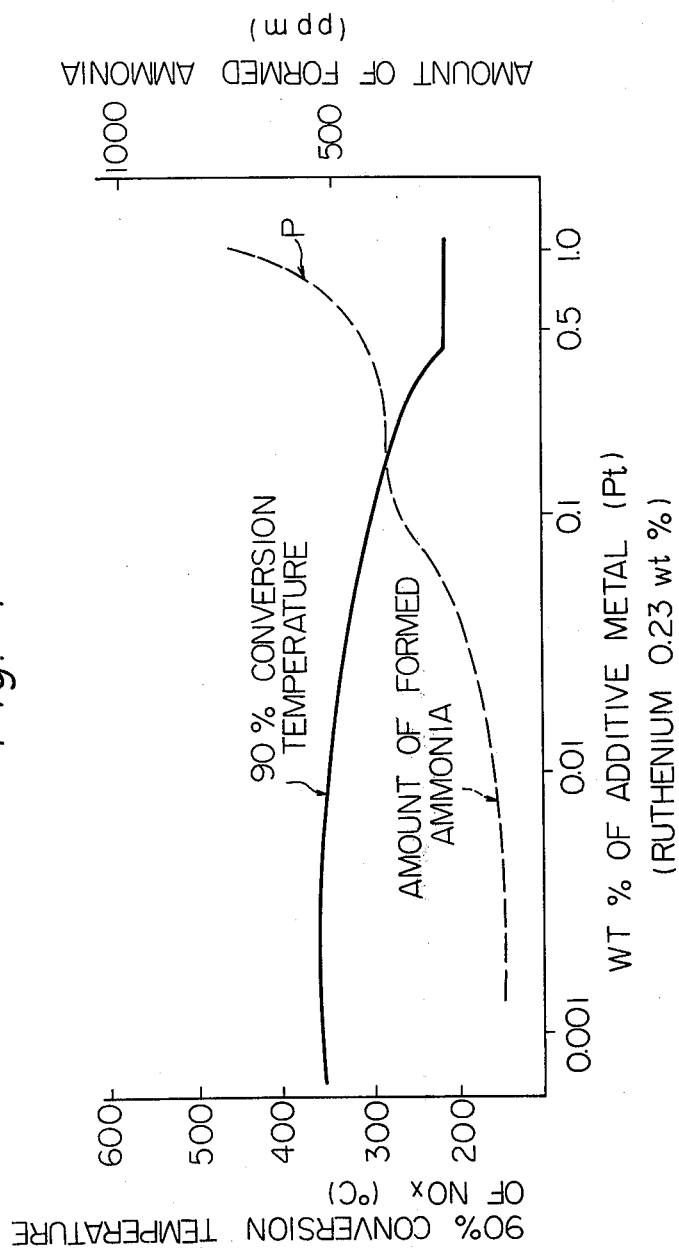

United States Patent [19]

Numagami et al.

[11] 3,909,456

[45] Sept. 30, 1975

[54] CATALYST FOR PROMOTING REDUCTION OF NITROGEN OXIDES CONTAINED IN EXHAUST GASES

[75] Inventors: Kiyoshi Numagami, Yokohama; Toshiki Okuyama, Fujisawa; Tadanari Kato, Yokohama, all of Japan

[73] Assignee: Nissan Motor Company Limited, Yokohama, Japan

[22] Filed: Apr. 12, 1973

[21] Appl. No.: 350,499

[30] Foreign Application Priority Data

Apr. 15, 1972 Japan.............................. 47-36867

[52] U.S. Cl.......... 252/472; 252/466 PT; 423/213.5
[51] Int. Cl.².......................................... B01J 23/40
[58] Field of Search..................... 252/466 PT, 472; 423/213.5

[56] References Cited
UNITED STATES PATENTS

| | | | |
|---|---|---|---|
| 3,118,727 | 1/1964 | Cohn................................. | 423/239 |
| 3,257,163 | 6/1966 | Stiles................................ | 423/213.2 |
| 3,615,166 | 10/1971 | Hindin et al. .................. | 252/466 PT |
| 3,637,344 | 1/1972 | Thompson ..................... | 252/466 PT |
| 3,741,725 | 6/1973 | Graham ........................... | 423/213.7 |
| 3,767,764 | 10/1973 | Dolbear ........................... | 423/213.5 |
| 3,784,675 | 1/1974 | Kobylinski et al. .............. | 423/213.5 |
| 3,809,743 | 5/1974 | Unland et al. ................... | 423/213.5 |

FOREIGN PATENTS OR APPLICATIONS

| | | | |
|---|---|---|---|
| 662,460 | 12/1951 | United Kingdom.............. | 423/213.2 |
| 1,009,609 | 11/1965 | United Kingdom.............. | 423/213.5 |

*Primary Examiner*—W. J. Shine

[57] ABSTRACT

A catalyst for reducing nitrogen oxides contained in exhaust gases, comprising a major portion of a carrier, and 0.02 to 0.85 wt% of ruthenium. The catalyst may also contain platinum, rhodium and/or palladium. The catalyst is obtained by immersing the carrier in an aqueous solution containing a catalytic component or components, and calcining the same in a flow of hydrogen gas at 300° to 1,000°C.

5 Claims, 2 Drawing Figures

CATALYST FOR PROMOTING REDUCTION OF NITROGEN OXIDES CONTAINED IN EXHAUST GASES

This invention relates to a catalyst for eliminating by a catalytic reduction reaction, nitrogen oxides contained in an exhaust gas which is emitted from an internal combustion engine of a motor vehicle, and also to a method of preparing a catalyst of the nature mentioned above.

Exhaust gases emitted from internal combustion engines usually contain hydrocarbons, carbon monoxide etc., resulting from partial or incomplete combustion of fuels, and nitrogen oxides produced by the reaction between oxygen and nitrogen gases contained in the air used for the combustion of fuels at elevated temperatures. These automotive exhaust gases cause a serious problem of air pollution in addition to the waste gases from industrial plants. In order to prevent air pollution caused by the emission of these noxious compounds, it is highly desirable to render the exhaust or waste gases harmless by oxidizing the carbon monoxide and hydrocarbons in the exhaust gases, and by reducing or decomposing the nitrogen oxides contained therein before the exhaust gases are released into the open air. For this purpose, the exhaust gases are usually subjected to a catalytic treatment which involves the above-mentioned oxidization and reduction reactions, as is well known in the art.

A catalyst used to accomplish these reactions, particularly in exhaust gases of internal combustion engines of motor vehicles, should meet the following requirements:

1. Prolonged active life showing optimum reactivity for oxidization and reduction of the noxious compounds for as long a period of time as possible.
2. High low-temperature performance, viz., the capability of being operatively active at relatively low temperatures.
3. High conversion efficiency for oxidizing combustible compounds and reducing nitrogen oxides which are contained in exhaust gases within a temperature range of about 100°C to 900°C.
4. High mechanical strength, particularly in resistance to wear, mechanical shock, and vibration which occur during operation of motor vehicles.
5. Low resistance to the flow of exhaust gases which are passed through the catalyst.
6. Non-generation of noxious secondary reaction products.

Of these, the requirements (2), (4) and (5) are not satisfactorily met by conventional catalysts in the form of pellets or tablets. However, the requirements are all met by a catalyst in the form of a block having a volume of from several tenths of a liter fo several liters, and having a number of passageways passing through the block in one or more directions. A catalyst of this nature is generally called a "monolithic catalyst," and will be herein referred to as such. A monolithic catalyst typically has a honeycomb, sieve, or corrugated style cross-section. In contrast to such a monolithic catalyst, a catalyst in the form of a pellet or tablet will be herein referred to as a "non-monolithic catalyst." The monolithic catalyst is considered particularly suitable for treating automotive exhaust gases, although a catalyst in the form of pellets or tablets is acceptable for use in the treatment of exhaust gases of industrial plants and other types of internal combustion engines. A monolithic catalyst can be easily prepared by an impregnation method; i.e., by impregnating a previously moulded monolithic carrier structure in a solution containing catalytic components, and then calcining the resultant carrier to produce a monolithic catalyst. The term "monolithic carrier" utilized above is intended to define a carrier having a structure similar to that of a monolithic catalyst defined hereinbefore.

Various kinds of catalysts for reducing nitrogen oxides into innocuous compounds have been previously proposed, which usually involve the following reduction reactions:

$$2NO + 2CO \rightleftharpoons N_2 + 2CO_2 \qquad (1)$$

$$2NO + 2H_2 \rightleftharpoons N_2 + 2H_2O \qquad (2)$$

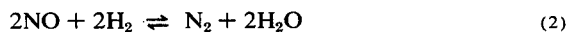

$$2NO + 5H_2 \rightleftharpoons 2NH_3 + 2H_2O \qquad (3)$$

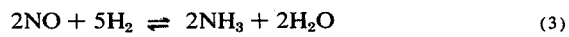

Generally, platinum or palladium show extremely high low-temperature activity as compared with catalysts of other types; i.e., the 90% conversion temperature (which will be defined hereinafter) of platinum or palladium with regard to nitrogen oxides is as low as 300° – 400°C. However, palladium or platinum have great disadvantages in that when used as catalysts, they convert most of the nitrogen oxides into harmful ammonia.

It is therefore an object of the invention to provide a catalyst suitable for catalytically reducing nitrogen oxides contained in exhaust gases emitted, particularly, from automotive internal combustion engines, converting the nitrogen oxides into innocuous substances through reduction.

It is another object of the invention to provide a reduction catalyst which is excellent in low-temperature activity or performance.

It is still another object of the invention to provide a reduction catalyst which produces an extremely low amount of ammonia.

It is still another object of the invention to provide a method of preparing a catalyst of the nature mentioned above.

The present inventors have discovered as a result of a number of experiments, that among the six elements of the platinum group, ruthenium has the most excellent low-temperature activity, and produces ammonia in only a small amount when used as a reduction catalyst for nitrogoen oxides. In order to further improve the low-temperature performance and to suppress the production of ammonia, rhodium, palladium, platinum, or a mixture thereof may be added to the ruthenium. The catalyst of the present invention comprises a major portion of a carrier, and 0.02 to 0.85% by weight of ruthenium. Rhodium, palladium, and/or platinum additives may be included, and are preferred to be within a range of 0.001 to 0.7% by weight.

Figure 2:
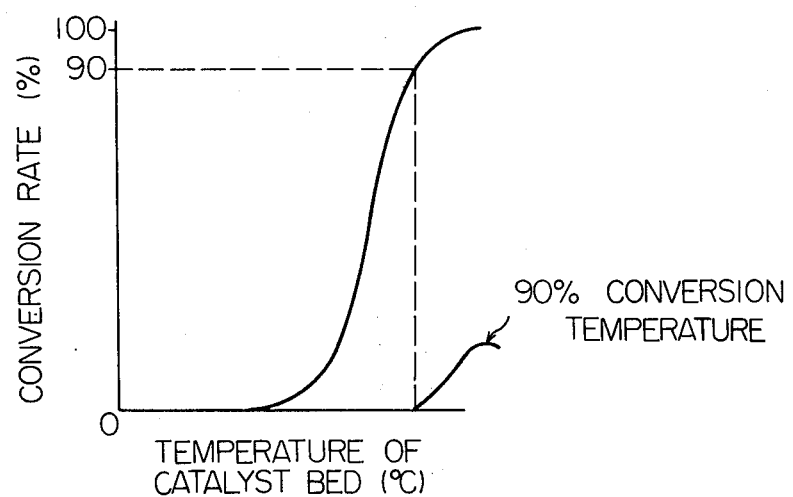

Other objects, features, and advantages of the present invention will be further understood from the following detailed description taken in conjunction with the accompanying drawings in which:

FIG. 1 is a plot showing by a solid line the relationship between the concentration of platinum, and the temperature at which 90% of the nitrogen oxides are converted into innocuous compounds (i.e., the 90% conversion temperature), and also showing by a dotted line, the relationship between the concentration of platinum and the amount of ammonia formed by the reaction, wherein the concentration of ruthenium is maintained at a constant level of 0.23% by weight; and FIG. 2 is a plot showing the relationship between the catalyst bed temperature and the conversion rate (%) of nitrogen monoxide as tested.

As described above, the concentration of ruthenium is preferred to be within a range of 0.02 – 0.85% by weight for efficiently reducing the nitrogen oxides, which are contained in exhaust gases, into innocuous compounds. This range has been determined through a number of experiments, which showed that when the concentration of ruthenium is lower than 0.02% by weight, the ruthenium can not be uniformly distributed over the entire surface of a carrier, thus causing a reduction in catalytic activity. The upper limit for the concentration of ruthenium has been determined by the following reasoning: Ruthenium has great activity, and can produce the required reduction reactions to a sufficient degree whenever the amount of ruthenium is over a minimum level. However, it is disadvantageous to use ruthenium in excessive amounts for economic reasons. Thus, it is considered advantageous to establish the upper limit of ruthenium concentration at 0.85%.

If rhodium, palladium, platinum, or a mixture thereof is added to ruthenium in a large amount, the low-temperature activity is greatly improved. However, the formation of ammonia disadvantageously increases with an increase in the amount of additive metal or metals. On the contrary, if the additive metal is used in a small amount, the low-temperature activity is not improved at all. In this connection, FIG. 1 shows the variation of the 90% conversion temperature of $NO_x$ and concentration of formed ammonia as functions of the wt % of platinum which is added to the ruthenium, wherein the concentration of ruthenium is maintained at a constant level of 0.23 wt %. The curves of FIG. 1 are obtained under catalytic reduction conditions which will be described in connection with Examples.

As is apparent from FIG. 1, if the amount of platinum is less than 0.001 wt %, the 90% conversion temperature is almost constant, and the effects of the platinum can not be observed. On the other hand, the amount of ammonia formation abruptly increases at a platinum concentration greater than 0.7 wt % as is shown by point P of FIG. 1. These parameters remain unchanged even if rhodium, palladium or a mixture thereof is used instead of platinum, and even if the amount of ruthenium is changed within the range defined above. Therefore, the additive metal or metals are mixed with the ruthenium within a range of 0.001 to 0.70 wt %.

The catalyst of the present invention can be prepared by various methods. One of the methods comprises steps of; immersing a carrier in a solution of a water-soluble ruthenium salt with or without addition of a compound of palladium, rhodium and/or platinum; removing the resultant carrier from the solution; drying the immersed carrier; and calcining the resultant carrier in a flow of hydrogen gas at a temperature of 300°C to 1,000°C to obtain a final catatlyst, said catalyst containing therein a major portion of said carrier and 0.02 to 0.85 wt % of ruthenium. Furthermore, the carrier which is removed from the solution may be treated with ammonia gas so as to make uniform distribution of catalyst metals on the carrier.

The carrier may be of the previously defined monolithic type or of non-monolithic type. The monolithic type carrier may be formed from a material containing alumina such as cordierite, beta-spondumene, or alpha-alumina. A typical example of a monolithic carrier according to the present invention is of a stacked superposed corrugated type with eight flutes per inch, and interlayer walls each having a thickness of 0.1mm. If on the other hand, a non-monolithic carrier in the form of tablets, pellets or particles is employed, the same may be formed from alumina containing material including alpha-alumina, gamma-alumina, delta-alumina or chi-alumina, or the like.

Furthermore, a platinum, palladium, or rhodium salt or compound or a mixture thereof may be added to the ruthenium salt. The salts are preferred to be in the form of a water-soluble compound such as a chloride, nitrate: or the like; for example, a ruthenium salt such as ruthenium (III) chloride; a rhodium salt such as rhodium (III) nitrate; a palladium salt such as palladium (II) nitrate or palladium (II) chloride; and a platinum compound such as chloroplatinic acid.

The present invention will be further illustrated by the following examples of the present invention, and comparative examples employing compositions and their preparation which are beyond the scope of the present invention. The examples are shown by way of illustration only, and it is not intended to limit the invention to the particular forms shown.

EXAMPLE I 1 liter of a cordierite monolithic carrier is immersed in a 1.44% ruthenium trichloride solution, and is then removed from the solution. Any excess of solution remaining in the passageways of the carrier is removed by shaking. Then, the resulting carrier is dried in a drying furnace at about 100°C for 15 hours. The carrier is then calcined in a flow of hydrogen gas at 800°C for 3 hours to obtain a monolithic catalyst. The block of the resultant catalyst contains therein 0.23% by weight of ruthenium.

EXAMPLE II 0.785 liters of a cordierite monolithic carrier are immersed in an aluminum chloride-saturated aqueous solution which contains 1.13 wt % ruthenium trichloride and 0.025 wt % chloroplatinic acid, and is then removed from the solution. Any excess of solution remaining in the passageways of the carrier is removed by shaking, and ammonia gas is passed through the passageways at a flow rate of 25 l/min for 30 min. Thereafter, the carrier is dried in a drying furnace at about 100°C for 15 hours, and is calcined in a flow of hydrogen gas at 800°C for 3 hours to obtain a catalyst. The block of the resultant catalyst contains therein 0.24 wt % ruthenium and 0.003 wt % platinum.

EXAMPLE III 1 liter of a cordierite monolithic carrier is immersed in an aqueous solution containing therein 1.44 wt % ruthenium trichloride and 0.012 wt % palladium (II) nitrate, and is then removed from the solution. Any excess of solution remaining in the passageways of the carrier is removed by shaking, and the carrier is then dried in a drying furnace at about 100°C for 15 hours. Thereafter, the carrier is calcined in a flow of hydrogen gas at 800°C for 3 hours to obtain a monolithic catalyst.

The block of the resultant catalyst contains therein 0.24 wt % ruthenium and 0.003 wt % palladium.

EXAMPLE IV 0.785 liters of a cordierite monolithic carrier are immersed in an aqueous solution containing 1.13 wt % ruthenium trichloride and 0.012 wt % rhodium nitrate, and are then removed from the solution. Any excess of solution remaining in the passageways of the carrier is removed therefrom by shaking. Then, the carrier is dried in a drying furnace at about 100°C for 15 hours, and thereafter is calcined in a flow of hydrogen gas at 800°C for 3 hours to produce a monolithic catalyst. The block of the resultant catalyst contains therein ruthenium and rhodium in amounts by weight of 0.24% and 0.008%, respectively.

EXAMPLE V 0.785 liters of a cordierite monolithic carrier are immersed in a solution containing 1.13 wt % of ruthenium trichloride, 0.025 wt % of chloroplatinic acid, and 0.021 wt % of rhodium nitrate, and are then removed from the solution. Any excess of solution remaining in the passageways of the carrier is removed by shaking. Then, ammonia gas is passed through the passageways at a flow rate of 30 l/min for 40 min. Thereafter, the carrier is dried in a drying furnace at about 100°C for 15 hours. Then, the carrier is calcined in a flow of hydrogen gas at 800°C for 3 hours to obtain a catalyst. The block of the resulting catalyst contains therein ruthenium, platinum and rhodium in amounts of 0.24 wt %, 0.008 wt %, and 0.004 wt %, respectively.

EXAMPLE VI 1 liter of a cordierite monolithic carrier is immersed in an aqueous solution containing 1.13 wt % ruthenium trichloride, 0.015 wt % chloroplatinic acid, 0.05 wt % rhodium (III) nitrate, and 0.28 wt % palladium (II) nitrate, and is then removed from the solution. Any excess of solution remaining in the passageways of the carrier is removed therefrom by shaking, and ammonia gas is passed through the passageways at a flow rate of 3 l/min for 7 min. Then, the carrier is dried in a drying furnace at about 100°C for 15 hours. The resultant carrier is then calcined in a flow of hydrogen gas at 800°C for 3 hours to obtain a catalyst. The block of the resulting catalyst contains therein ruthenium, platinum, rhodium, and palladium in amounts of 0.22 wt %, 0.005 wt %, 0.002 wt % and 0.007 wt %, respectively.

EXAMPLE VII 1 liter of a cordierite monolithic carrier is immersed in a solution containing 1.45 wt % ruthenium trichloride and 1.71 wt % palladium (II) chloride, and is then removed from the solution. Any excess of solution remaining in the passageways of the carrier is removed therefrom by shaking. Then, ammonia gas is passed through the passageways at a flow rate of 35 l/min for 60 min. Then, the carrier is dried in a drying furnace at about 110°C for 15 hours, and is thereafter calcined in a flow of hydrogen gas at 550°C for 3 hours to obtain a catalyst. The block of the resulting catalyst contains therein ruthenium and palladium in amounts of 0.29 wt % and 0.32 wt %, respectively.

Platinum and palladium catalysts were prepared for comparison with those prepared in accordance with the present invention as described in the above examples. The composition and preparation of these platinum and palladium catalysts are described as follows:

COMPARATIVE EXAMPLE I 0.785 liters of a cordierite monolithic carrier were immersed in a 2.58 wt % chloroplatinic acid solution, and were then removed from the solution. Any excess of solution remaining in the passageways of the carrier was removed therefrom by shaking. Then, the carrier was dried in a drying furnace at about 100°C for 15 hours and was subsequently calcined in a flow of hydrogen gas at 800°C for 3 hours to obtain a catalyst. The block of the resulting catalyst contained therein 0.45 wt % platinum.

COMPARATIVE EXAMPLE II 0.785 liters of a cordierite monolithic carrier were immersed in a 1.15 wt % palladium (II) nitrate solution and were then removed from the solution. Any excess of solution remaining in the passageways was removed therefrom by shaking. The thus treated carrier was then dried in a drying furnace at 100°C for 15 hours and was calcined in a flow of hydrogen gas at 800°C for 3 hours to obtain a catalyst. The block of the resulting catalyst contained therein 0.2 wt % palladium.

ACTIVITY TEST

Activity tests were conducted involving catalysts prepared according to EXAMPLES I to VII of the present invention, and COMPARATIVE EXAMPLES I and II to determine the catalytic activities thereof. A gas mixture of the composition indicated in Table 1 was used as a test mixture for catalytic reduction reaction of the nitrogen oxides contained therein at a space velocity of 15,000 hr$^{-1}$. The temperature of the catalyst bed was varied within a range of 100° to 600°C such that a general relationship between catalyst temperature and nitrogen monoxide conversion efficiency was determined for each of the catalysts prepared, as is shown in FIG. 2. The conversion efficiency herein mentioned is defined as the percentage of nitrogen monoxide contained in the gas mixture which is converted into innocuous compounds such as nitrogen and water.

Table 1

| Constituent | | Concentration |
| --- | --- | --- |
| Nitrogen monoxide | (ppm) | 1000 |
| Propane | (ppm) | 500 |
| Carbon monoxide | % by volume | 2.0 |
| Carbon dioxide | % by volume | 12.0 |
| Oxygen | % by volume | 0.5 |
| Hydrogen | % by volume | 1.0 |
| Water vapor | % by volume | 5.0 |
| Nitrogen | | To make 100% by volume |

For comparison of the activities of the various catalysts prepared according to EXAMPLES I to VII and COMPARATIVE EXAMPLES I AND II, a 90% conversion temperature at which 90% of the nitrogen monoxide contained in the gas mixture is reduced by action of the catalyst as shown in FIG. 2 is defined and employed in determining the low-temperature activities of catalysts which are prepared according to EXAMPLES I to VII and COMPARATIVE EXAMPLES I and II. It is apparent, in this instance, that the lower the temperature providing a conversion efficiency of 90 percent, the higher the low-temperature activity or performance of the catalyst. On the other hand, the higher the 90% conversion temperature, the lower the low-temperature activity. However, a catalyst which entails production of ammonia is obviously unacceptable, even if it shows high activity at low temperature. Thus, a catalyst which has high activity at low temperature and has the function of selectively accelerating the reducing reactions without producing harmful secondary reaction products is considered to be superior in overall properties.

The catalysts of EXAMPLES I through VII and COMPARATIVE EXAMPLES I and II were tested by means of reduction reaction of the gas mixture shown in Table 1. The 90 percent conversion temperature and amount of ammonia produced at the 90% conversion temperature of each catalyst are shown in Table 2.

Table 2

| Catalyst | | 90% Conversion Temperature of NO (°C) | Amount of Produced Ammonia (ppm) |
| --- | --- | --- | --- |
| Example | 1 | 340 | 80 |
| | 2 | 280 | 100 |
| | 3 | 260 | 180 |
| | 4 | 300 | 140 |
| | 5 | 275 | 160 |
| | 6 | 290 | 120 |
| | 7 | 210 | 205 |
| Comparative Example | 1 | 360 | 800 |
| | 2 | 380 | 740 |

As is apparent from Table 2, the reduction catalysts of the present invention show excellent low temperature activity without production of harmful ammonia as compared with those of the COMPARATIVE EXAMPLES.

What is claimed is:

1. A method for preparing a catalyst for reducing nitrogen oxides contained in exhaust gases, said method comprising the steps of: forming a monolithic carrier in a desired form; immersing said carrier in an aqueous solution containing a ruthenium salt so as to support ruthenium in an amount of 0.02 – 0.85% by weight, and a salt of at least one metal selected from the group consisting of palladium, platinum and rhodium so as to support the at least one metal in an amount of 0.001 to 0.7% by weight; removing the immersed carrier from the solution; exposing the carrier to a flow of ammonia gas; drying the carrier; and calcining the resultant carrier in a flow of hydrogen gas at a temperature of 300°C to 1,000°C.

2. A method as claimed in claim 1, wherein said ruthenium salt is ruthenium (III) chloride.

3. A method as claimed in claim 1, wherein said palladium salt is selected from the group consisting of palladium (II) nitrate and palladium (II) chloride.

4. A method as claimed in claim 1, wherein said rhodium salt is rhodium (III) nitrate.

5. A method for preparing a catalyst for reducing nitrogen oxides contained in exhaust gases, said method comprising the steps of: forming a monolithic carrier in a desired form; immersing said carrier in an aqueous solution containing a ruthenium salt so as to support ruthenium in an amount of 0.02 – 0.85% by weight, and chloroplatinic acid so as to support the metal in said acid in an amount of 0.001 to 0.7% by weight; removing the immersed carrier from the solution; exposing the carrier to a flow of ammonia gas; drying the carrier; and calcining the resultant carrier in a flow of hydrogen gas at a temperature of 300°C to 1,000°C.

* * * * *